(12) United States Patent
Pfann et al.

(10) Patent No.: US 6,459,182 B1
(45) Date of Patent: Oct. 1, 2002

(54) ELECTRIC MOTOR WITH BRAKE

(75) Inventors: Jochen Pfann, Sternenfels; Gerhard Flörchinger, Harthausen, both of (DE)

(73) Assignee: Sew-Eurodrive GmbH, Bruchsal (DE)

( * ) Notice: Subject to any disclaimer, the term of this patent is extended or adjusted under 35 U.S.C. 154(b) by 0 days.

(21) Appl. No.: 09/607,988

(22) Filed: Jun. 30, 2000

Related U.S. Application Data

(63) Continuation-in-part of application No. 09/303,012, filed on Apr. 30, 1999, now abandoned.

(30) Foreign Application Priority Data

May 14, 1998 (DE) .......................................... 198 21 730
Aug. 21, 1998 (DE) .......................................... 198 38 171

(51) Int. Cl.$^7$ .......................... H02K 11/00; H02K 7/10; F16D 65/24
(52) U.S. Cl. .............................. 310/77; 310/93; 310/71; 188/171; 188/161
(58) Field of Search .............................. 320/77, 76, 92, 320/93, 98; 188/71, 171, 161, 162; 318/362, 372

(56) References Cited

U.S. PATENT DOCUMENTS

| | | | | |
|---|---|---|---|---|
| 2,321,205 A | | 6/1943 | Hodgson ...................... 310/77 |
| 3,044,593 A | | 7/1962 | Scarrott et al. ................ 310/77 |
| 3,665,231 A | | 5/1972 | Wendler ...................... 310/77 |
| 3,763,968 A | | 10/1973 | Noly .......................... 188/171 |
| 4,156,478 A | * | 5/1979 | Kroeger ...................... 188/171 |
| 4,921,078 A | * | 5/1990 | Sommer ...................... 188/171 |
| 5,186,288 A | * | 2/1993 | Sommer ...................... 188/171 |
| 5,497,860 A | | 3/1996 | Hendricks .................... 188/162 |
| 5,631,510 A | | 5/1997 | Flaig et al. .................... 310/77 |
| 5,635,781 A | | 6/1997 | Moritan ....................... 310/71 |
| 5,699,883 A | * | 12/1997 | Albrecht ...................... 188/171 |
| 5,731,649 A | * | 3/1998 | Caamano ...................... 310/216 |
| 5,986,368 A | * | 11/1999 | Wetzel et al. ................. 310/71 |
| 6,211,590 B1 | * | 4/2001 | Albrecht et al. .............. 310/77 |

FOREIGN PATENT DOCUMENTS

| | | |
|---|---|---|
| DE | 3904881 A1 | 2/1989 |
| DE | 41 26 672 A1 | 8/1991 |

* cited by examiner

*Primary Examiner*—Nestor Ramirez
*Assistant Examiner*—Dang Dinh Le
(74) *Attorney, Agent, or Firm*—Marshall, Gerstein & Borun

(57) ABSTRACT

The invention relates to an electric motor (1) with a rotor (2) and a housing (3) that has at one end a brake-mounting end shield (4) to support a shaft (5) of the rotor (2) that passes through the brake-mounting end shield (4). The electric motor (1) further comprises an electromagnetically actuated brake (10), which comprises a magnet body (17) with a brake coil (11). An armature plate (13), which can be pulled by the magnet body (17) against a braking pressure force exerted by springs (12), is substantially nonrotatably mounted in a guide mechanism (15) but can be axially displaced in the direction of the shaft (5). A brake rotor (20), against which the armature plate (13) is apposed with the braking pressure when no current is flowing through the brake coil (11), is fixed to the shaft (5), preferably by way of a drive element (28). In accordance with the invention the brake (10) is prefabricated so as to be complete except for the drive element (28) and to be independent of the bearing of the motor shaft, and can be screwed to the housing (3). The effort of installing and removing the brake can thus be considerably reduced in comparison to previously known electric motors with electromagnetically actuated brake.

15 Claims, 8 Drawing Sheets

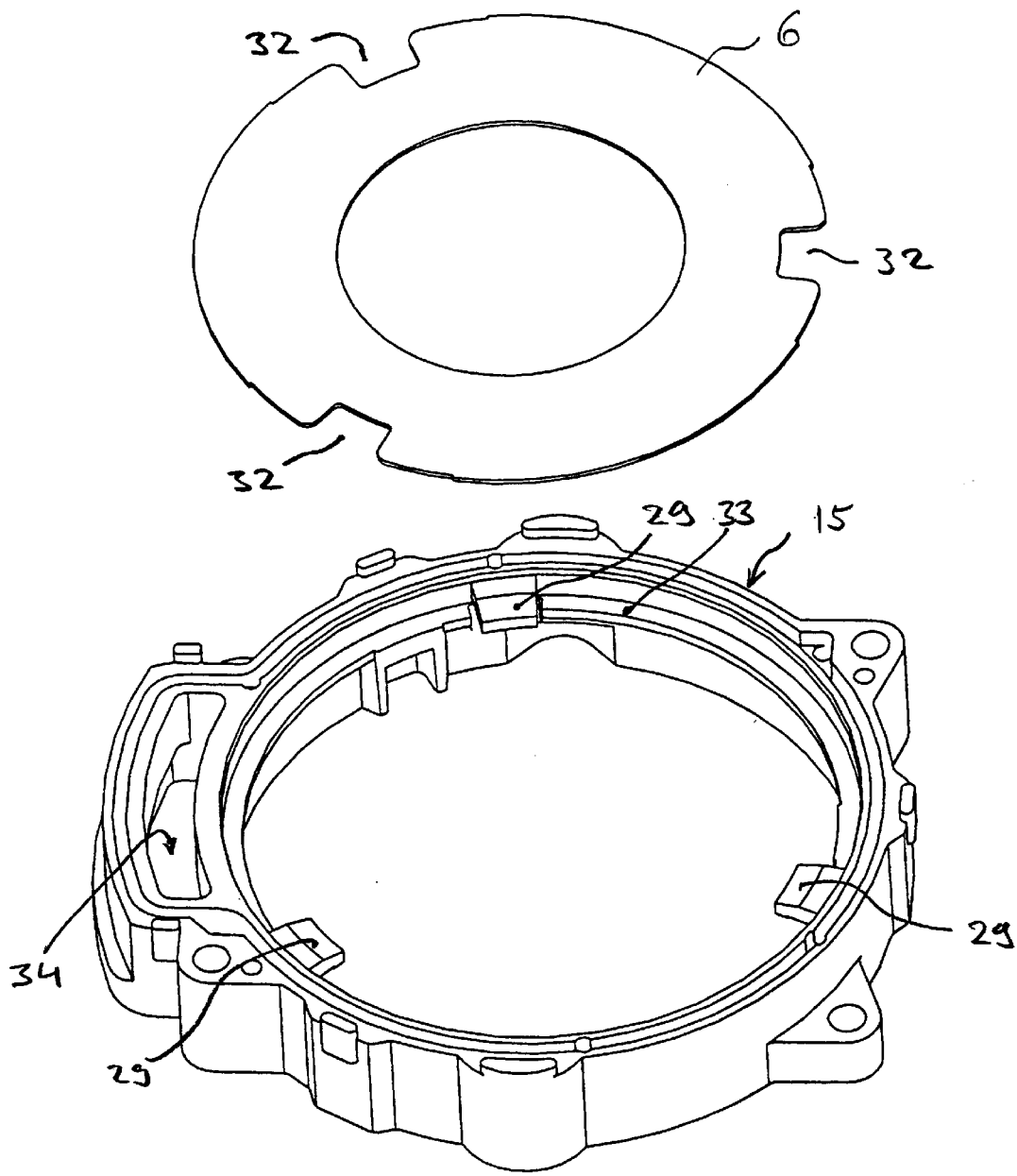

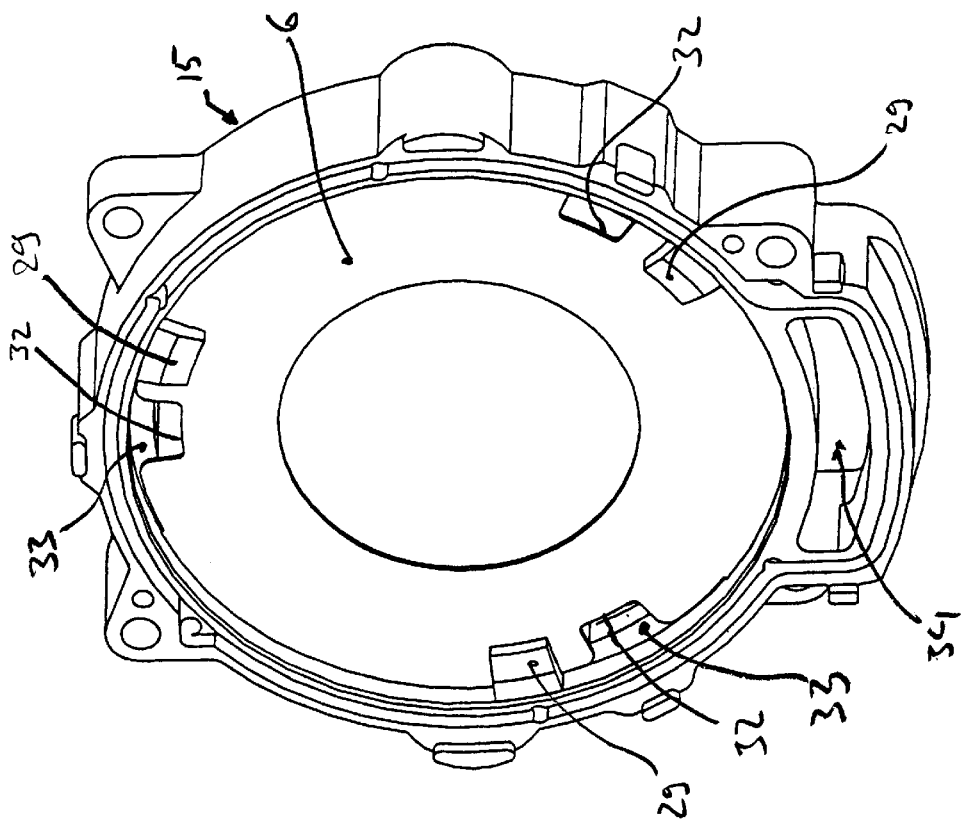
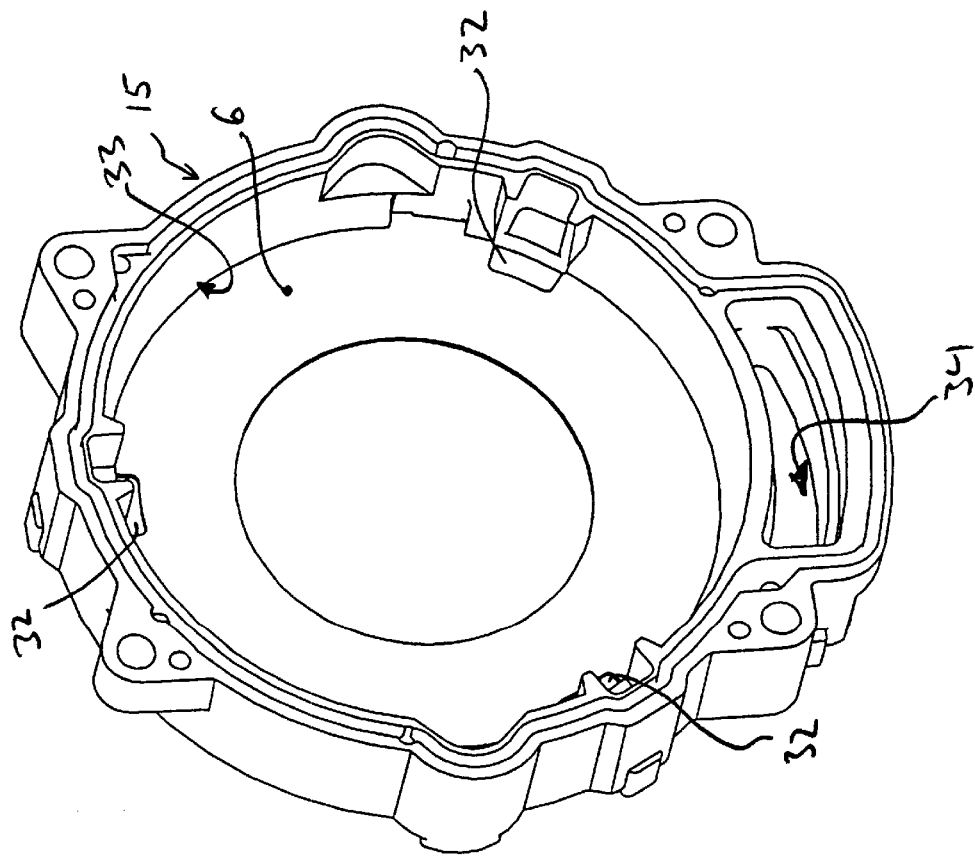

ELECTRIC MOTOR WITH BRAKE

This is a continuation-in-part application of application Ser. No. 09/303,012, filed Apr. 30, 1999, abandoned.

The invention relates to an electric motor with an electromagnetically actuated brake.

BACKGROUND OF THE INVENTION

From the German patent DE 41 26 672 C2 an electric motor with an electromagnetically actuated brake is known. The brake comprises between a body of an electromagnet and a brake disk an axially movable armature plate that is guided nonrotatably along a shaft of the electric motor. The shaft is supported by a brake-mounting end shield of the motor, which closes off the end of a housing of the motor. The shaft extends through the brake-mounting end shield to the exterior thereof. When the brake is applied, i.e. after the current through the electromagnet has been turned off, the armature plate is pressed by spring force against brake linings of a lining carrier that is connected to the shaft on the outside of the brake-mounting end shield. The armature plate thus stops the rotational movement of the lining carrier by friction against the brake lining, as soon as the magnetic field of the electromagnet has sufficiently decayed.

When the brake is being raised, i.e. in particular when the current through the electromagnet is turned on, a force is exerted on the armature plate, in particular an attractive magnetic force, which is stronger than the opposing mechanical force exerted by the springs, so that the armature plate is released from the lining carrier and returns to rest against the magnet body.

The armature plate is guided in such a way that it cannot rotate about the axis of rotation of the shaft, which in the known electric motor is achieved by axial bores or axially directed recesses in the armature plate, through which extend in the axial direction bolts or screws that simultaneously attach the magnet body of the brake to the brake-mounting end shield of the electric motor.

These bolts or screws also determine the distance in the axial direction between the brake-mounting end shield of the motor and the magnet body of the brake, so that an axial travel distance for the operation of the brake, or the axial movement of the armature plate, is specified. By adjusting the bolts or screws, the axial travel can be reduced, in order to compensate for frictional wear of the brake lining on the carrier disk.

An electric motor with brake of the kind described in DE 41 26 672 C2 is also known to comprise a terminal box for electrically connecting the motor and the brake. From the terminal box, cables to supply the brake or its electronics pass to the brake through the end of the housing on the brake side of the electric motor.

The brake described in DE 41 26 672 C2 is a pre-fitted brake, which is mounted directly as part of the electric motor. Therefore the brake can be made compact. The overall length, the weight and the work of manufacturing it are thus less than in brakes constructed separately which need to be installed subsequently on the housing of the motor.

One such subsequently installed brake, for example, is screwed to a flange on the outer surface of an end face of the electric motor. In order to bear the weight of the brake, the flange is of relatively thick and stable construction. The outer side of the flange serves as brake surface, against which the lining carrier rotating with the shaft is pressed when the brake is applied. The lining carrier, as in the case of the pre-fitted brake described above, comprises on its side facing away from this frictional flange surface a brake lining which, when the brake is applied, performs frictional work on the armature plate. The armature plate of the subsequently installed brake likewise is secured against rotating with the motor shaft by bolts or screws, which simultaneously serve to attach the electromagnet to the flange.

During installation or maintenance of known electric motors with electromagnetically actuated brakes, in many cases the brake can be installed or removed only together with the brake-mounting end shield of the motor. In other cases, although the brake can be taken away from the end shield while leaving the latter attached to the motor, there are other parts besides the lining carrier between the shield of the brake and the brake-mounting end shield of the motor, which must be installed individually or which when the brake is being removed can unintentionally become detached and fall down. Examples of such additional parts include compression springs, which press a brake inductor core by way of pressure rings aginst the stop provided by long fixation screws, and spacer sleeves to determine the axial distance between brake shield and motor end shield.

Furthermore, when the braking process is initiated, i.e. when the brake is applied, in the electric motors with brakes described above the armature plate and/or the fixation bolts or screws or the spacer sleeves are exposed to wear and tear because owing to its braking torque the armature plate strikes against the bolts or screws. The parts thus striking against one another are customarily all made of metal, which causes a high degree of wear. The noise produced by these impacts is also frequently disturbing. In some conditions, it is impossible to maintain the prescribed noise limits in the workplace. In addition, the effort of installing and removing many individual parts and the costs of manufacturing them are considerable.

When brakes are being removed from an electric motor into which one or more cables pass, if the work is not carried out with the greatest care and precaution, the cables may be damaged or even torn out.

It is the object of the present invention to disclose an electric motor with an electromagnetically actuated brake of the kind cited above that is reliable in operation and in which the effort of installing and removing the brake is minimized.

SUMMARY OF THE INVENTION

In accordance with the invention the brake is constructed as a completely prefabricated unit which can be screwed to the housing of the electric motor.

The brake rotor, however, is already provided within the completely prefabricated brake, so that the entire component represented by the prefabricated brake can be installed on the electric motor by inserting the shaft of the motor into the brake rotor, after which all that must be done is to create the mechanical connection (fixation bolts) between brake and motor.

Therefore when the brake is being installed, all that is required is to connect the brake rotor in a rotationally stable manner to the shaft of the electric motor and fix the brake to the housing, in particular by means of screws. The installation of other individual parts such as spacer sleeves, compression springs and the like is eliminated. Therefore operations, in particular exchanging the brake for a replacement, can be carried out in an extremely short time. This is especially important for use in mass-production equipment, because the stoppage time for maintenance can be kept short. Furthermore, the brake-mounting end shield of the electric motor need not be removed, so that during the maintenance work the interior of the motor remains largely protected from dirt. Complete prefabrication also offers the advantage that the brake can be more rapidly and hence economically assembled at the site of manufacture than at the place where it is to be used.

When such a prefabricated brake in accordance with the present invention is compared with a conventional, completely assembled brake for subsequent installation, the main difference is that once the assembly of a brake according to the state of the art has been completed, the brake is functional in itself, whereas the prefabricated brake disclosed here initially does not function. The reason is that it lacks the brake-mounting end shield of the electric motor, without which neither the large moment of torque produced here nor the heat generated during braking can be dissipated.

Preferably a plug-and-socket device is provided through which current can be supplied to the coil of the brake's electromagnet, which can be connected together when the brake is being installed, in particular is being screwed onto the housing of the electric motor. This measure allows the cable connections between the motor and the brake to be free of imposed loads and therefore to remain undamaged even though no particular care is taken. Installation is additionally simplified in that the electrical connections need not be produced by screwing cables on. In particular with suitable integration of the plug-and-socket device into the housing of the motor and/or into the brake, the electrical connection is produced simply by setting the brake onto the housing.

Especially preferred is a further development in which the guide mechanism, by means of which the armature plate is made substantially nonrotatable but can be displaced axially in the direction of the shaft of the electric motor, is constructed as a ring connected, in particular screwed, to the magnet body. The ring can in particular be made of a plastic material by injection molding. In any case, however, the ring serves several functions, namely a housing function and the guide function for the armature plate, so that a high degree of integration and modularity is achieved. As opposed to several bolts or screws, which take over the guide function in known electric motors, the ring has the advantage of being a single component or component group, which can be more simply and cost-effectively installed.

Preferably the ring establishes a distance in the axial direction between the brake-mounting end shield and the magnet body of the brake, so that a fixed, nonadjustable axial travel distance is specified for actuation of the brake. In this case, brake linings or in particular a brake lining with high resistance to abrasion is used, so that replacement is necessary only after many braking cycles. In this further development, the ring also serves to establish the distance between the brake end shield of the electric motor and the magnetic body of the brake. Therefore the technically elaborate maintenance procedure of adjusting the distance is eliminated. By dimensioning the ring precisely, the distance can be determined once and for all in advance, during manufacture. In order to employ distances that differ slightly from one another, a useful solution is to manufacture a plurality of different rings and keep them in reserve for use as needed. By this means, in the rare cases in which adjustment of the axial travel is required in order to operate the brake, it can be achieved by simply exchanging the ring. It is also possible in this way to change the distance when a brake is to be used for different purposes. Preferably the ring is screwed to the brake shield with only short screws (in comparison to the long screws used to attach the brake to the motor). Hence the ring can be exchanged in an extremely short time.

Preferably the ring comprises at least one groovelike, axially extending guide recess to accommodate a projection from the armature plate. Alternatively, the ring can bear the projection and the recess can be formed on the armature plate. In either case reliable guidance is produced, which prevents the armature plate from rotating with the shaft of the electric motor during braking. In particular if the ring is made of plastic, during braking the impact- and noise-attenuating properties of plastics are advantageous. The amount of wear is slight.

In a favorable embodiment of the brake in accordance with the invention the guide mechanism and the magnet body comprise sealing devices to seal the prefabricated brake. For example, by circumferential sealing rings inserted into grooves in the shield the movable parts of the brake can effectively be protected from the entry of dirt. This contributes to lowering the frequency of maintenance.

Preferably the ring comprises first parts of a pin-and-socket device and the brake-mounting end shield comprises second parts thereof, which serve to conduct current to the brake coil and/or to electronic circuitry associated with the brake. The first and second parts of this device are so constructed that when the brake is being screwed onto the housing, they come into electrical contact with one another. In particular, the first parts of the pin-and-socket device are integrated into the ring in such a way that they can be connected to the second parts during installation without exact positioning of the brake, the pin-and-socket device itself guiding the brake into just the right mounting position. Subsequently the brake need merely be screwed onto the housing of the electric motor.

It is advantageous for the brake rotor and also the armature plate to be disposed so that they can be axially displaced. A drive element connected to the shaft is preferably provided to carry the brake rotor along in a rotationally stable manner.

Preferably during the braking procedure the brake rotor comes into engagement with a metal friction sheet disposed on the brake-mounting end shield, where it performs braking work when no current is supplied to the brake coil.

An important aspect of the present invention lies in the fact that the prefabricated brake in accordance with the invention in itself can be manipulated as a single component; that is, it is unlike the brakes known according to the state of the art in that the latter must be installed piece by piece on an electric motor, thus acquiring their final form only gradually, in successive increments. This cohesiveness of the various components in the present invention is achieved by a friction sheet which, so to speak, is positioned as the outermost component or final component between the brake housing and the brake-mounting end shield of the electric motor, and which is fastened to the housing parts of the prefabricated brake. As a result of this friction sheet the brake is closed on the side facing the electric motor (during installation), apart from an opening through which the shaft of the motor passes, so that all the brake components are held together. In the installed state, i.e. when the prefabricated brake has been installed on an electric motor, the friction sheet is in direct contact with the brake-mounting end shield of the electric motor, so that the torque produced during braking and the heat generated in the process are taken up by the brake-mounting shield of the electric motor.

In a particularly advantageous embodiment the brake rotor comprises a brake body that extends in one continuous piece in the axial direction, in order to generate braking friction on the armature plate and where appropriate also on the brake-mounting end shield or on the friction plate. In particular when a long-lived material is used for the brake rotor and when a ring is used as guide mechanism for the armature plate, in this way later adjustment of the brake can be avoided.

As opposed to known embodiments of brake rotors, in which a lining carrier bears separate brake linings on one or both sides, because the above measure involves fewer different parts it allows smaller dimensional tolerances to be maintained during manufacture, so that it is possible to achieve the target value for the axial travel distance in operation of the brake without subsequent reworking.

Embodiments of the brake rotor are also known in which the braking surface on the end face of the brake rotor to generate braking friction on the armature plate and where appropriate on the brake-mounting end shield is interrupted or covered with several separate brake linings. In a further development the brake rotor advantageously has on its end face a substantially rotationally symmetrical braking surface to generate braking friction on the armture plate and where appropriate a second such braking surface to generate braking friction on the brake-mounting end shield or on the friction sheet. Hence the braking surfaces can be enlarged as compared to known constructions, which tends to prolong the operating life of the brake linings or the in particular one-piece brake rotor.

BRIEF DESCRIPTION OF THE DRAWINGS

An embodiment of the present invention will now be explained with reference to the drawing. However, the invention is not limited to this embodiment. The individual figures in the drawing show the following:

FIG. 6 shows in perspective an exploded view of a guide ring and a friction plate on the side of the guide ring that faces the electric motor, FIG. 7 is a perspective view of the guide ring with friction sheet inserted, as seen from the inside of the brake, FIG. 8 is a perspective view of the arrangement according to FIG. 7, but showing the opposite side, which faces the electric motor.

DETAILED DESCRIPTION

Figure 1:
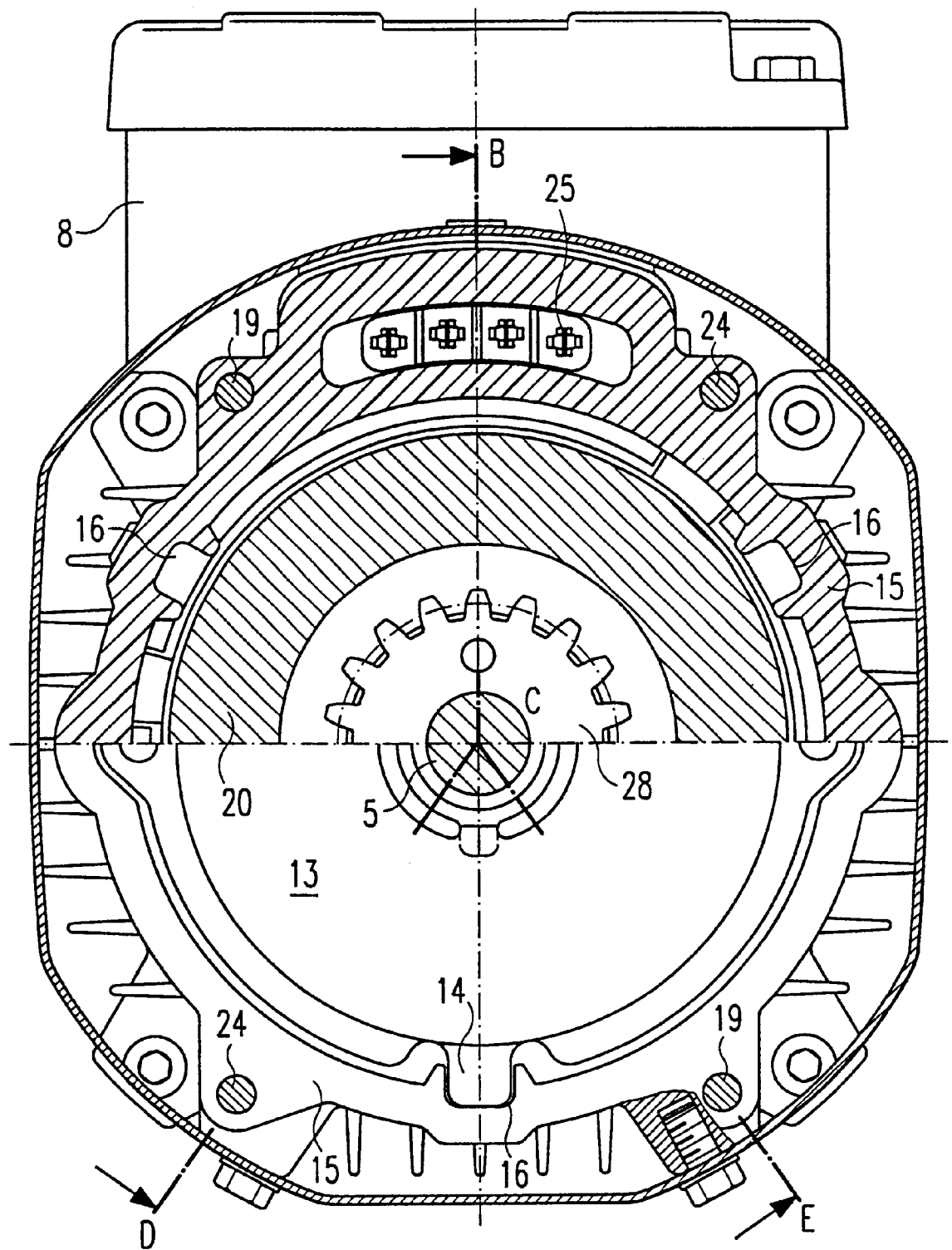
FIG. 1 shows a stepwise cross section through an embodiment of the brake in accordance with the invention.

In the following description the same reference numerals are used for identical parts and parts with identical actions.

Figure 3:
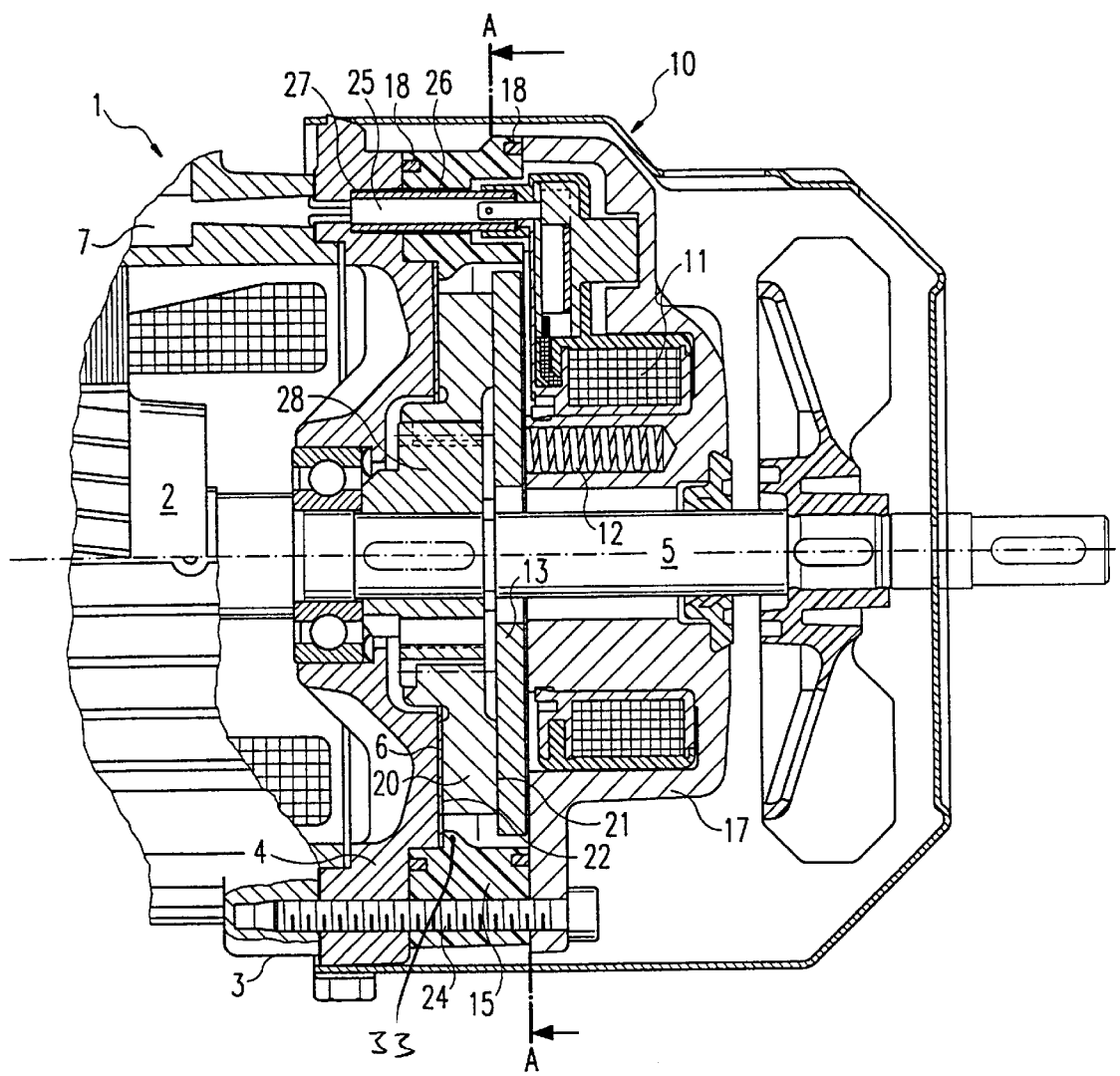
FIG. 3 shows an angled longitudinal section along the line B–D in FIG. 1.

FIG. 1 shows a stepwise cross section along the line A—A in FIG. 3. As can best be seen in FIG. 3, a prefabricated brake 10 is screwed to the brake-mounting end shield 4 of an electric motor 1. The positions of the two long screws 24 that connect the brake 10 to the electric motor 1 can best be seen in FIG. 1: they are opposite one another with respect to the center of the shaft 5 of the electric motor 1. The electric motor 1 comprises a rotor 2, which is connected to a shaft 5 that extends through the brake-mounting end shield 4 of the motor 1. The brake-mounting end shield 4 closes off the housing 3 of the motor 1 on the brake-mounting end. As is evident in FIG. 3, the brake-mounting end shield 4 comprises a projecting, disk-shaped end surface that is covered by a friction sheet 6. The friction sheet 6 is detachably fixed to the brake 10 by a bayonet connection, as will be explained in greater detail with reference to FIG. 4.

The shaft 5 of the rotor 2 projects so far out of the brake-mounting end shield 4 that the brake 10 and other devices, not described here, are disposed around the shaft 5 outside the housing 3. The brake 10 comprises a brake coil 11 by means of which a magnetic attractive force can be exerted on an armature plate 13, so as to pull the armature plate 13 into contact with the magnet body 17. This attractive force is opposed by the pressures exerted by compression springs 12, of which only one is visible in the longitudinal section of FIG. 3. The magnet body 17, the brake coil 11, the armature plate 13 and a brake rotor 20 extend around the shaft 5 of the motor 1 in a substantially rotationally symmetrical shape. A carrier element 28 is the only component directly important for the braking function of the brake 10 that is not already included in the prefabricated brake 10 during its manufacture. The carrier element 28 is connected to the shaft 5 in a rotationally stable manner and the brake rotor 20 is set onto the carrier element 28 so that it rotates therewith but can be displaced axially thereupon. The brake rotor 20 comprises a first, armature-plate-sided braking surface 21 and a second, friction-sheet-sided braking surface 22, each of which has a rotationally symmetrical structure. The brake rotor 20 is constructed as a single piece in the region between the first 21 and second 22 braking surface and consists of a material resistant to abrasion, so as to avoid the need to readjust the brake in the axial direction because of wear.

Figure 2:
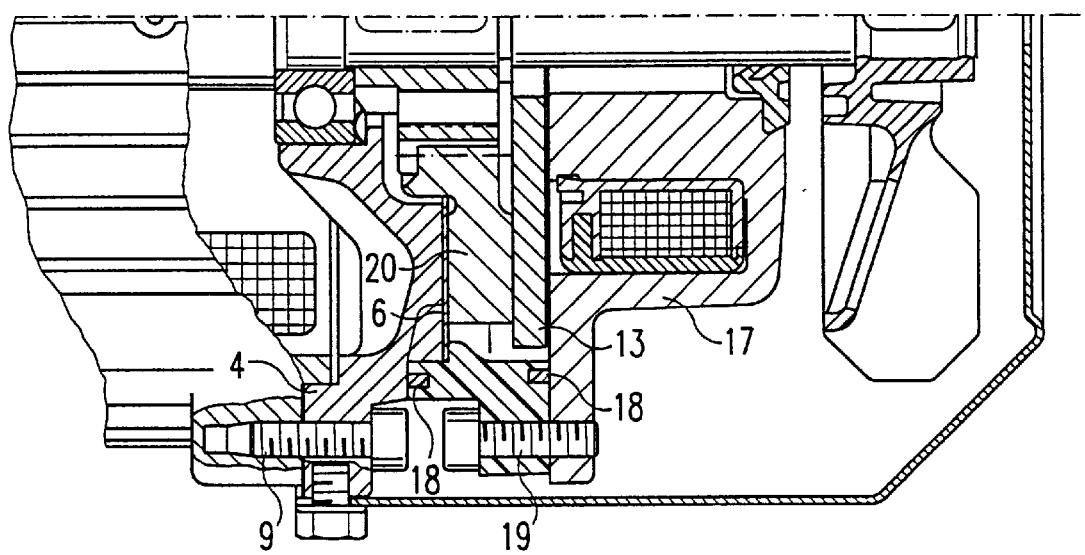
FIG. 2 shows a longitudinal section through one side along the line C–E in FIG. 1.

The prefabricated brake 10 further comprises a guide ring 15 which, as best shown by FIG. 1, circumferentially encloses the shaft 5, the armature plate 13 and the brake rotor 20. The guide ring 15 comprises three guide recesses 16, which extend like grooves in the axial direction and each of which accommodates one projection 14 from the armature disk 13. Because of the stepwise sectional representation in FIG. 1, only one of the projections 14 is visible. Because the projections 14 are guided within the guide recesses 16, the armature plate 13 is substantially prevented from rotating about the shaft 5. During the braking process, therefore, friction is reliably produced between the armature plate 13 and the brake rotor 20. As can be seen in FIG. 3 and FIG. 2, two circumferentially closed gaskets 18 are provided in the guide ring 15, one gasket 18 being provided to seal the guide ring 15 against the magnet body 17 and the other to seal it against the brake-mounting end shield 4. The interior space of the brake 10, defined by the guide ring 15, is thus completely sealed off, at least around its circumference. The guide ring 15 is made of plastic by injection molding. The injected gaskets 18 are disposed in circular grooves in the guide ring 15.

In addition there is integrated into the guide ring 15 a pin 26 of a pin-and-socket connector 25, which serves for electrical connection of the brake 10. When the brake 10 is being installed, the pin 26 is inserted into a corresponding socket 27 attached to the brake-mounting end shield 4. From there a cable (not shown) leads through the cable bushing 7 to the terminal box 8 (see FIG. 1), which is connected to the housing 3 of the electric motor 1. In the terminal box 8 is situated the connector for the electricity supply to both the motor 1 and the brake 10. Alternatively, the terminal box can be disposed on the brake. In this case the electricity to supply the motor is sent from the brake to the motor by way of a pin-and-socket connector disposed in the guide ring.

In the following the completely prefabricated nature of the brake 10 and the process of mounting it on the electric motor 1 will be discussed. The brake 10 is delivered from the factory complete and ready for mounting. For this purpose, the brake 10 is fully prefabricated except for the carrier element 28. The guide ring 15 is screwed onto the magnet body 17 with two short screws 19 (see FIG. 2). The position of the two short screws 19 with respect to one another can be seen in FIG. 1. They are disposed axially symmetrically to one another with respect to the axis of rotation of the shaft 5, at opposite places on the brake 10.

Two additional short screws 9 serve to attach the brake-mounting end shield 4 to the housing 3 of the electric motor 1, at positions defined by projecting the long axes of the short screws 19 in the installed state of the brake 10 (FIG. 2).

Figure 4:
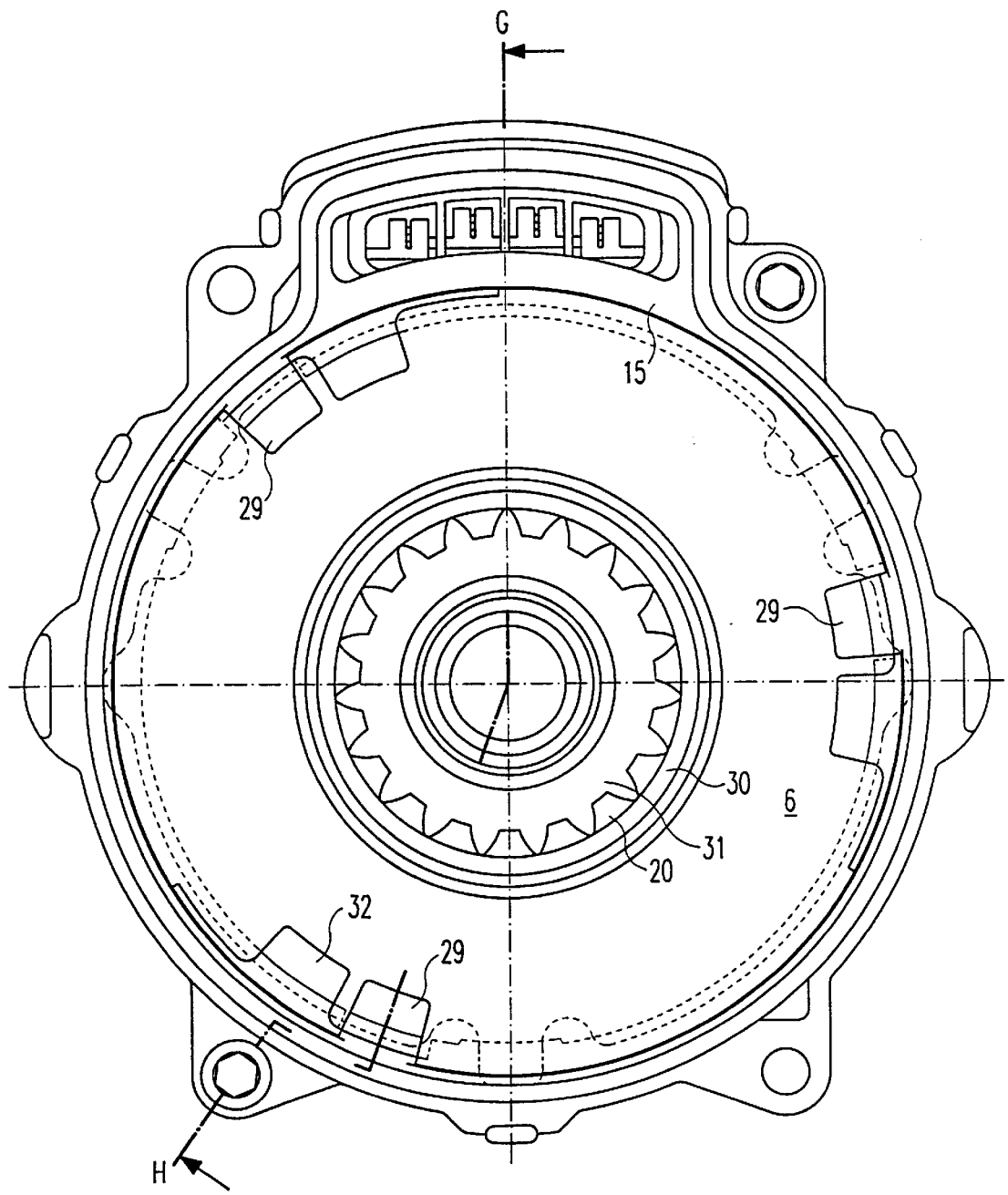
FIG. 4 shows a view of the end face of the prefabricated brake with friction sheet inserted.
Figure 5:
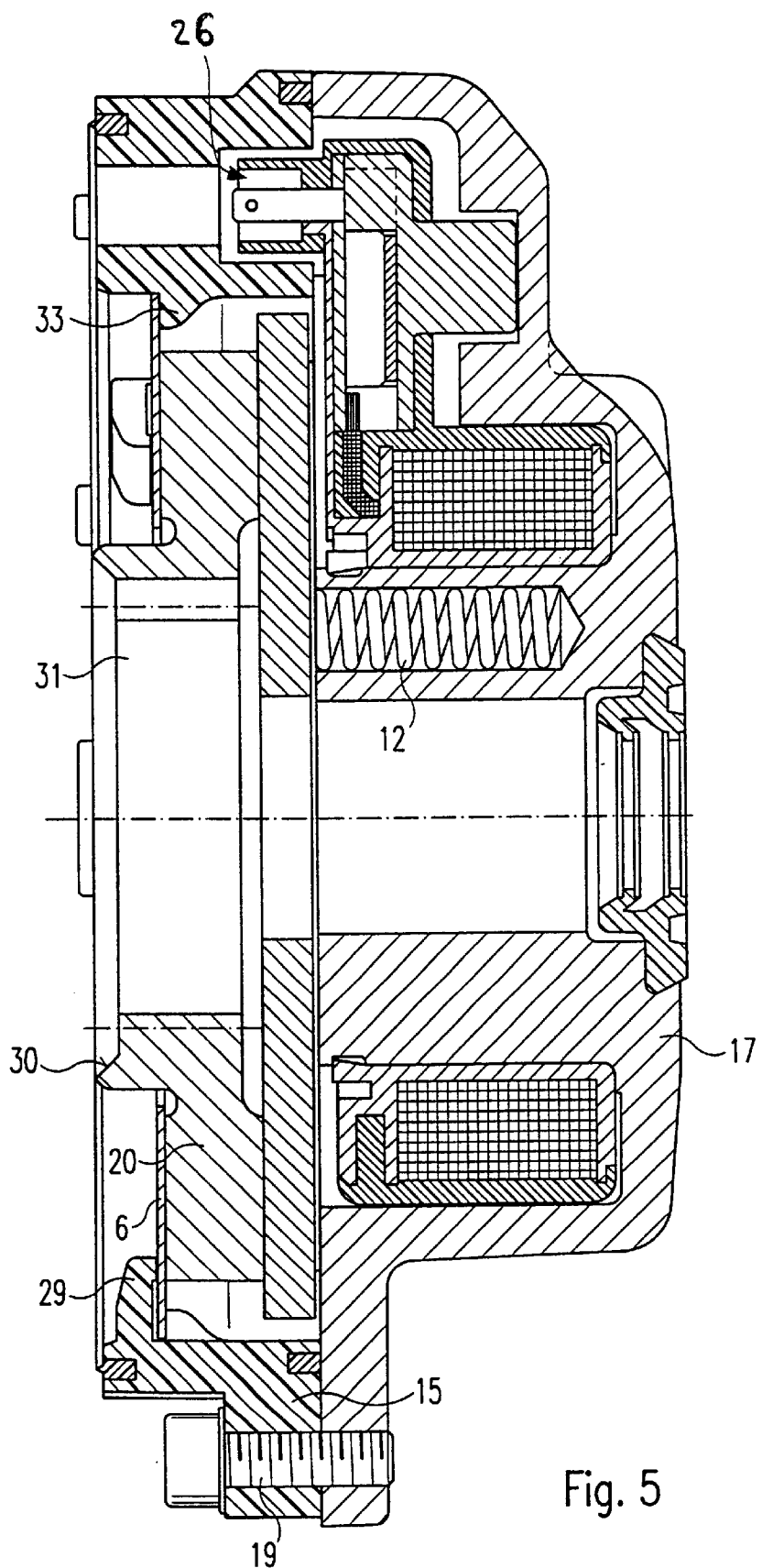
FIG. 5 shows an angled, stepwise longitudinal section along the line G–H in FIG. 4.
Figure 10:
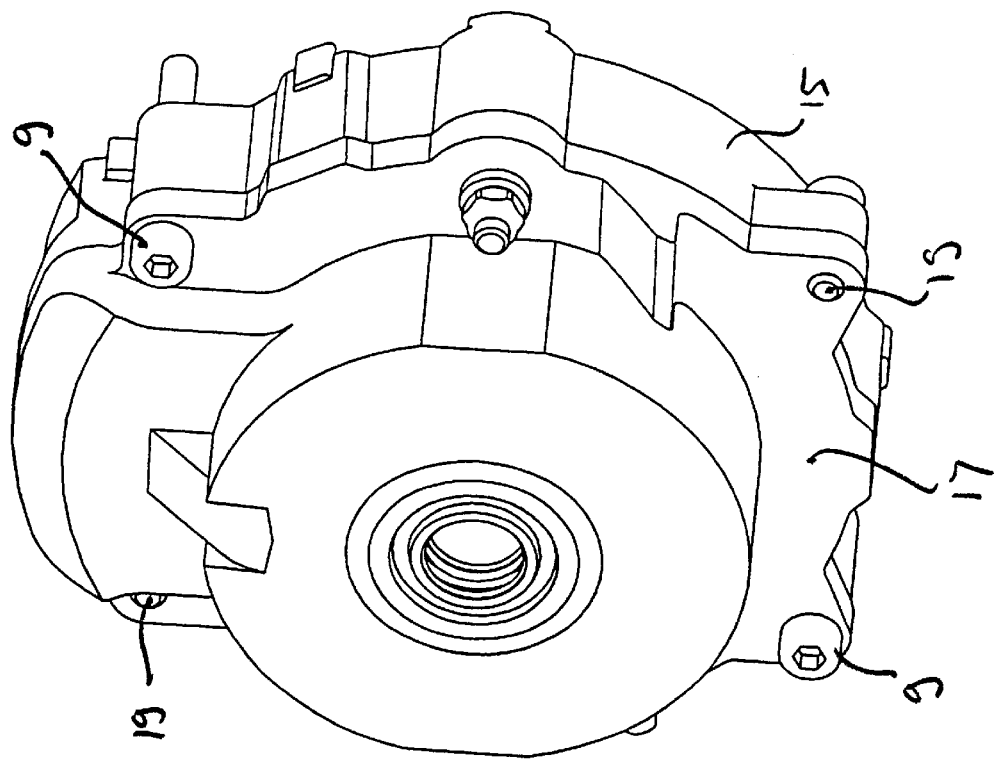
FIG. 10 is a perspective view of the brake according to FIG. 9, but seen from the opposite direction.

As can be discerned in FIG. 4, before the brake 10 is mounted on the housing 3 of the electric motor, the friction sheet 6 is attached to the brake 10 by a bayonet connection. The guide ring 15 comprises three lugs, the function of which will be described below. The metal friction sheet 6 comprises three corresponding recesses 32. The friction sheet 6 is put onto the end face of the brake 10 by a linear movement approximately parallel to the axis of rotation along which the shaft 5 will later extend, so that the friction sheet 6 moves past the lugs 29 and into contact with the brake rotor 20; then the friction sheet is turned clockwise about the axis of rotation so that it is secured against falling out. The linear movement is stopped by contact with a shoulder 33 having approximately the profile of a nose that is formed by the guide ring 15 (FIG. 5).

In the prefabricated state with friction sheet 6 in position, the pressure forces of the compression springs 12 are exerted on the lugs 29 of the guide ring 15, by way of the components armature plate 13, brake rotor 12 and friction sheet 6.

In the subsequent installation of the brake 10, the guide ring 15 is positioned so that the pin 26 is inserted into the socket 27, and two long screws 24 are pushed through the guide ring 15 at the places shown in FIG. 1 and through corresponding bores in the brake-mounting end shield 4 into threaded bores in the housing 3 of the motor 1, where they are screwed in (FIG. 3).

When the brake is in the mounted position, the pressure is removed from the lugs 29 of the guide ring 15. The friction sheet 6 is apposed to a planar surface of the brake-mounting end shield and a working air gap necessary for perfect operation of the brake is formed between the armature plate 13 and the magnet body 17. By pressing forces transmitted through the shoulder 33 of the guide ring 15, the friction sheet 6 is pressed against against the brake-mounting end shield 4 so that it cannot be twisted.

The working air gap is specified on one hand by the distance between the point of contact of the friction sheet 6 with the shoulder 33 of the guide ring 15 and the bearing surface of the magnet body 17, and on the other hand by the thicknesses of armature plate 13 and brake rotor 20. Because the guide ring 15 is firmly apposed to the magnet body 17, the working air gap is determined by the distance from the bearing surface of the shoulder 33 to the bearing surface for the magnet body 17, and hence by the dimensions of the guide ring and the dimensions of the brake rotor 20 plus the armature plate 13.

The pin-and-socket connector, which is at least partly integrated into the guide ring 15, can also be constructed otherwise, as is known to those skilled in the art. What is claimed as essential to the invention is at least the idea of integrating part of the pin-and-socket connector or the entire pin-and-socket connector into the guide ring 15.

In FIG. 4 can be discerned yet another advantageous characteristic of the prefabricated brake in accordance with the invention. The brake rotor comprises a receiving opening 31 to receive the carrier element 28, which is fixed to the shaft 5 of the motor. So that the carrier element 28 can better be inserted into the receiving opening 31, or so that the prefabricated brake 10 can better be set onto the carrier element 28, the brake rotor 20 on its end face that when installed is towards the brake-mounting end shield 4 comprises a tapered entranceway 30 to facilitate insertion of the carrier element 28.

As can be seen in the upper half of FIG. 1, the carrier element 28 is shaped like a cogwheel in cross section. Accordingly, the interior contour of the receiving opening 31 of the brake rotor (20) has a complementary shape (FIG. 4).

To install the brake 10, the complete brake 10 is set onto the carrier element 28 or onto the shaft 5, during which process the shaft 5 and/or the brake rotor 20 are turned slightly back and forth until the prefabricated brake 10 is fitted to the electric motor, after which the two are screwed together.

Figure 9:
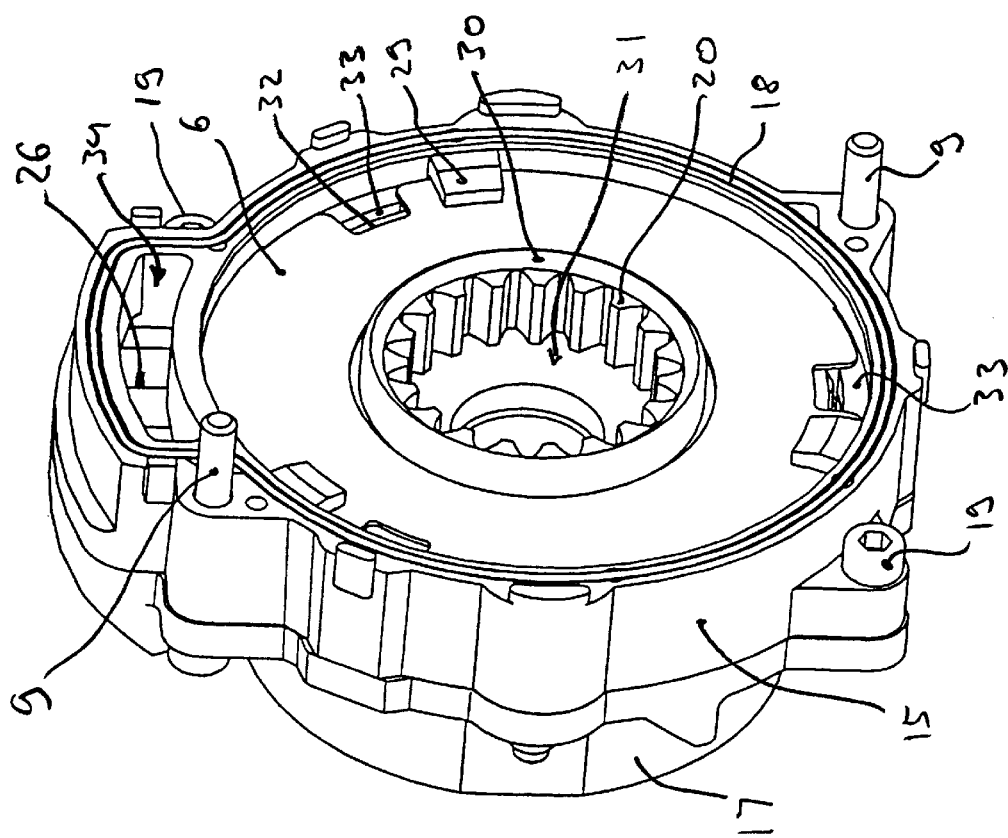
FIG. 9 is a view of the completely prefabricated brake in the state in which it can be installed on an electric motor, showing the side that faces the electric motor.

As can again be clearly seen in FIG. 6, the guide ring 15 comprises three inward extending lugs 29, and within the friction sheet 6 there are corresponding apertures 32. Hence the friction sheet 6 can be set into the guide ring 15 at an angular position such that the apertures 32 are aligned with the lugs 29, and then rests with its circumferential edge on the shoulder 33. In this position the friction sheet 6 is then rotated so that the apertures 32 are no longer aligned with the lugs 29, as a result of which the friction sheet 6 is firmly held between the shoulder 33 and the lugs 29. This position is shown again in FIGS. 7 and 8, as seen from the interior of the brake in FIG. 7 and from outside the brake, with braking sheet 6 set into position, in FIG. 8. It will be evident here that the guide ring 15 together with the friction sheet forms a kind of lid, by means of which all the parts in the interior of the brake, in particular the brake rotor 20, are kept inside the prefabricated brake, even though the rotor 20 is pressed by the springs 12 against the braking sheet 6 during displacement of the armature plate 13. However, because the braking sheet 6 is locked behind the lugs 29, the rotor 20 as well as the armature plate 13 and the springs 12 remain substantially in the position shown in FIGS. 3 and 9. Although when thus fully assembled the brake cannot yet function on its own, as was explained in detail above, it can nevertheless be manipulated as a single component and installed on an electric motor. During installation the toothed part of the drive shaft 5 of the motor engages the corresponding teeth on the brake disk 20, and the socket connector 25 on the motor comes into electrical contact with the pin connector 26, which projects into a passageway 34 in the peripheral region of the guide ring 15. Thus by simply setting the brake into position, both the mechanical and the electrical connection between the brake and the electric motor are established. Then it is necessary merely to screw the threaded bolts 24 into the corresponding threaded bores in the housing 3 of the motor 1 in order to conclude the installation of the prefabricated brake on the electric motor.

The motor in accordance with the invention has the advantage that it is also functional without the prefabricated brake. On the other hand, the prefabricated brake cannot function without the brake-mounting end shield of the electric motor. There are two basic reasons for this:

- on one hand, the bracing in the axial direction required for the braking process is lacking, because both the armature plate 13 and the brake rotor 20 are made axially movable;
- on the other hand, the heat of friction generated at the friction sheet 6 during braking cannot be given off to the air in sufficient amounts, so that the friction sheet would begin to glow. It is therefore connected to another body with low thermal resistance, namely the brake-mounting end shield 4 of the electric motor. It is to this that the heat developed by the friction sheet 6 during braking is transferred. The brake-mounting end shield 4 is preferably made of metal and has a considerably greater heat capacity than the friction sheet 6.

Another reason for the inability of the prefabricated brake 10 to function without the brake-mounting end shield 4 of the motor is that it is not fully sealed to prevent penetration of moisture or dirt from the surroundings. The seal is not complete until the brake is installed on the brake-mounting end shield 4.

What is claimed is:

1. A prefabricated brake being assembled as a preassembled part for being mounted by screw means to an electric motor comprising a housing having a brake-mounting end shield at one end of the housing and a rotor comprising a rotor shaft passing through an aperture in said end shield and projecting from said end shield, said prefabricated brake comprising:

a brake housing forming a cavity defined by said brake housing and closed by said brake-mounting end shield of said electric motor and in which a brake coil and an associated magnetic body are mounted, an armature which is nonrotatably fixed in a guide mechanism formed in said cavity of said brake housing but can be displaced in a direction parallel of said rotor shaft by an electromagnetic pulling force generated by said brake coil and said associated magnetic body, spring means for pushing said armature in a direction opposite to said pulling force, a brake rotor for being nonrotatably but axially displacably mounted on said rotor shaft, a friction sheet being fixed to said brake housing, wherein, when said prefabricated brake is mounted to said electric motor, said armature, brake rotor and friction sheet being arranged so that when no electrical current is flowing through said brake coil, said spring means are pushing said armature against said brake rotor pressing said brake rotor against that friction sheet which is pressed to said brake mounting end shield so that, when said brake rotor is rotating together with said rotor, braking forces and heat generated by friction between said braking rotor and said friction sheet is transferred to said brake mounting end shield, and wherein, when said prefabricated brake is dismounted from said brake-mounting end shield of said electric motor, said friction sheet holds said spring means, said armature and said brake rotor within said cavity of said brake housing.

2. A prefabricated brake as claimed in claim 1, wherein said brake housing comprises said magnetic body and an annulus at a side of said brake housing where said friction sheet is mounted.

3. A prefabricated brake as claimed in claim 2, wherein the annulus is screwed to said magnetic body.

4. A prefabricated brake as claimed in claim 2, wherein said annulus acts as a spacer in the axial direction of the rotor shaft between the brake-mounting end shield and the magnetic body in order that a fixed axial travel distance is determined for the actuation of the brake.

5. A prefabricated brake as claimed in claim 2, wherein said guide mechanism comprises at least one groovelike guide recess which extends in a direction parallel to said rotor shaft and a correspondingly shaped projection projecting from said armature which is received by said guide recess.

6. A prefabricated brake as claimed in claim 2, wherein said annulus is made of a plastics material.

7. A prefabricated brake as claimed in claim 1, wherein sealing means are provided on said brake housing for sealing said brake housing with respect to said electric motor.

8. A prefabricated brake as claimed in claim 1, comprising a first and a second connector element which can be plugged together for establishing an electrical connection between said first and said second connector element, said first connector element being mounted to said electrical motor and said second connector being mounted to said brake housing and being connected to said brake coil, so that when said prefabricated brake is mounted to said electric motor, said first connector element is plugged into said second connector element and said brake coil is connected to said electric motor.

9. A prefabricated brake as claimed in claim 1, wherein the brake rotor is mounted on a carrier and is rotatable therewith and axially displacable there along, the carrier being connected to said rotor shaft.

10. A prefabricated brake as claimed in claim 1, wherein the said rotor comprises a unitary component which is axially continuous.

11. A prefabricated brake as claimed in claim 1, wherein the brake rotor has first and second end faces each comprising a substantially rotationally symmetrical braking surface to generate braking friction respectively on the armature and on the brake mounting end shield.

12. A prefabricated brake as claimed in claim 1, wherein the brake rotor defines a tapered entranceway leading to a receiving opening into which said rotor shaft is inserted during connection of said prefabricated brake to the motor.

13. An electric motor comprising a prefabricated brake being assembled as a preassambled part for being mounted by screw means aperture in said end shield and projecting from said end shield, said prefabricated brake comprising:

a brake housing forming a cavity defined by said brake housing and closed by said brake-mounting end shield of said electric motor and in which a brake coil and an associated magnetic body are mounted, an armature which is nonrotatably fixed in a guide mechanism formed in said cavity of said brake housing but can be displaced in a direction parallel of said rotor shaft by an electromagnetic pulling force generated by said brake coil and said associated magnetic body, spring means for pushing said armature in a direction opposite to said pulling force, a brake rotor for being nonrotatably but axially displacably mounted on said rotor shaft, a friction sheet being fixed to said brake housing, wherein, when said prefabricated brake is mounted to said electric motor, said armature, brake rotor and friction sheet being arranged so that when no electrical current is flowing through said brake coil, said spring means are pushing said armature against said brake rotor pressing said brake rotor against that friction sheet which is pressed to said brake mounting end shield so that, when said brake rotor is rotating together with said rotor, braking forces and heat generated by friction between said braking rotor and said friction sheet is transferred to said brake mounting end shield, and wherein, when said prefabricated brake is dismounted from said brake-mounting end shield of said electric motor, said friction sheet holds said spring means, said armature and said brake rotor within said cavity of said brake housing.

14. A prefabricated brake being assembled as a preassambled part for being mounted by screw means to an electric motor comprising a housing having a brake-mounting end shield at one end of the housing and a rotor shaft passing through an aperture in said end shield and a rotor comprising projecting from said end shield, said prefabricated brake comprising a brake housing forming a cavity defined by said brake housing and closed by said brake-mounting end shield of said electric motor and in which a brake coil and an associated magnetic body are mounted, an armature which is nonrotatably fixed in a guide mechanism formed in said cavity of said brake housing but can be displaced in a direction parallel of said rotor shaft by an electromagnetic pulling force generated by said brake coil and said associated magnetic body, spring means for pushing said armature in a direction opposite to said pulling force, a brake rotor for being nonrotatably but axially displacably mounted on said rotor shaft, a friction sheet being fixed to said brake housing, wherein, when said prefabricated brake is mounted to said electric motor, said armature, brake rotor and friction sheet being arranged so that when no electrical current is flowing through said brake coil, said spring means are pushing said armature against said brake rotor pressing said brake rotor against that friction sheet which is pressed to said brake mounting end shield so that, when said brake rotor is rotating together with said rotor, braking forces and heat generated by friction between said braking rotor and said friction sheet is transferred to said brake mounting end shield, and wherein, when said prefabricated brake is dismounted from said brake-mounting end shield of said electric motor, said friction sheet holds said spring means, said armature and said brake rotor within said cavity of said brake housing, further comprising a first and a second connector element which can be plugged together for establishing an electrical connection between said first and said second connector element, said first connector element being mounted to said electrical motor and said second connector being mounted to said brake housing and being connected to said brake coil, so that when said prefabricated brake is mounted to said electric motor, said first connector element is plugged into said second connector element and said brake coil is connected to said electric motor.

15. An electric motor comprising a prefabricated brake being assembled as a preassambled part for being mounted by screw means to said electric motor comprising a housing having a brake-mounting end shield at one end of the housing and a rotor comprising a rotor shaft passing through an aperture in said end shield and projecting from said end shield, said prefabricated brake comprising a brake housing forming a cavity defined by said brake housing and closed by said brake-mounting end shield of said electric motor and in which a brake coil and an associated magnetic body are mounted, an armature which is nonrotatably fixed in a guide mechanism formed in said cavity of said brake housing but can be displaced in a direction parallel of said rotor shaft by an electromagnetic pulling force generated by said brake coil and said associated magnetic body, spring means for pushing said armature in a direction opposite to said pulling force, a brake rotor for being nonrotatably but axially displacably mounted on said rotor shaft, a friction sheet being fixed to said brake housing, wherein, when said prefabricated brake is mounted to said electric motor, said armature, brake rotor and friction sheet being arranged so that when no electrical current is flowing through said brake coil, said spring means are pushing said armature against said brake rotor pressing said brake rotor against that friction sheet which is pressed to said brake mounting end shield so that, when said brake rotor is rotating together with said rotor, braking forces and heat generated by friction between said braking rotor and said friction sheet is transferred to said brake mounting end shield, and wherein, when said prefabricated brake is dismounted from said brake-mounting end shield of said electric motor, said friction sheet holds said spring means, said armature and said brake rotor within said cavity of said brake housing, further comprising a first and a second connector element which can be plugged together for establishing an electrical connection between said first and said second connector element, said first connector element being mounted to said electrical motor and said second connector being mounted to said brake housing and being connected to said brake coil, so that when said prefabricated brake is mounted to said electric motor, said first connector element is plugged into said second connector element and said brake coil is connected to said electric motor.

* * * * *